US012726256B2

(12) United States Patent
Kim et al.

(10) Patent No.: US 12,726,256 B2
(45) Date of Patent: Sep. 1, 2026

(54) METHOD AND DEVICE FOR UPLINK OR DOWNLINK TRANSMISSION/RECEPTION IN WIRELESS COMMUNICATION SYSTEM

(71) Applicant: LG Electronics Inc., Seoul (KR)

(72) Inventors: Hyungtae Kim, Seoul (KR); Jiwon Kang, Seoul (KR); Seongwon Go, Seoul (KR)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 18/576,674

(22) PCT Filed: Jul. 18, 2022

(86) PCT No.: PCT/KR2022/010418
§ 371 (c)(1),
(2) Date: Jan. 4, 2024

(87) PCT Pub. No.: WO2023/003290
PCT Pub. Date: Jan. 26, 2023

(65) Prior Publication Data

US 2024/0333370 A1 Oct. 3, 2024

(30) Foreign Application Priority Data

Jul. 20, 2021 (KR) ........................ 10-2021-0095175

(51) Int. Cl.
*H04B 7/06* (2006.01)
*H04L 5/00* (2006.01)
(Continued)

(52) U.S. Cl.
CPC ....... *H04B 7/06968* (2023.05); *H04L 5/0051* (2013.01); *H04W 72/1268* (2013.01); *H04W 72/231* (2023.01); *H04W 76/20* (2018.02)

(58) Field of Classification Search
CPC .. H04B 7/06968; H04B 7/024; H04B 7/0695; H04B 7/088; H04B 17/373;
(Continued)

(56) References Cited

U.S. PATENT DOCUMENTS

2019/0260532 A1* 8/2019 Manolakos ........... H04L 5/0094
2020/0322109 A1* 10/2020 Yu ......................... H04L 5/0044
(Continued)

FOREIGN PATENT DOCUMENTS

KR 10-20200088455 7/2020
KR 10-20200108459 9/2020
(Continued)

OTHER PUBLICATIONS

3rd Generation Partnership Project, Technical Specification Group Radio Access Network, 2021-03;3GPP TS 38.214, 3GPP TS 38.214 V16.5.0, pp. 1-171 (Year: 2021).*
(Continued)

*Primary Examiner* — Farid Seyedvosoghi
(74) *Attorney, Agent, or Firm* — Fish & Richardson P.C.

(57) ABSTRACT

A method and a device for uplink or a downlink transmission/reception in a wireless communication system are disclosed. A method by which a terminal performs uplink transmission or downlink reception, according to one embodiment of the present disclosure, may comprise the steps of: receiving, from a base station, configuration information about individual QCL RS for each of a plurality of port groups of a specific RS; and performing the uplink transmission or the downlink reception on the basis of at least one from among a plurality of QCL RSs corresponding to the plurality of port groups of a specific RS.

12 Claims, 9 Drawing Sheets

TRANSMITTING CONFIGURATION INFORMATION ON AN INDIVIDUAL QCL RS FOR EACH OF A PLURALITY OF PORT GROUPS OF A SPECIFIC RS TO THE UE — S910

PERFORMING UPLINK RECEPTION OR DOWNLINK TRANSMISSION BASED ON AT LEAST ONE OF A PLURALITY OF QCL RSS CORRESPONDING TO A PLURALITY OF PORT GROUPS OF A SPECIFIC RS — S920

(51) Int. Cl.

| | |
|---|---|
| ***H04W 72/1268*** | (2023.01) |
| ***H04W 72/231*** | (2023.01) |
| ***H04W 76/20*** | (2018.01) |

(58) Field of Classification Search

CPC ....... H04L 5/0051; H04L 5/00; H04L 5/0048; H04L 27/261; H04W 72/1268; H04W 72/231; H04W 72/046; H04W 72/1273; H04W 72/21; H04W 72/23; H04W 76/20

See application file for complete search history.

(56) References Cited

U.S. PATENT DOCUMENTS

| | | | | |
|---|---|---|---|---|
| 2022/0217742 | A1* | 7/2022 | Kim | H04L 5/0044 |
| 2022/0338233 | A1* | 10/2022 | Kim | H04L 5/0094 |
| 2025/0141499 | A1* | 5/2025 | Kang | H04W 72/12 |

FOREIGN PATENT DOCUMENTS

| | | | |
|---|---|---|---|
| KR | 10-20200135350 | | 12/2020 |
| SE | P202402963 A | * | 8/2022 |
| WO | WO 2019/161181 | | 8/2019 |

OTHER PUBLICATIONS

MediaTek Inc., Remaining Issues for Beam Management and Beam Failure Recovery, Aug. 20-24, 2018, 3GPP TSG RAN WG1 Meeting , R1-1808264, pp. 1-7 (Year: 2018).*

3GPP TS 38.214 V16.6.0 (Jun. 2021), 3rd Generation Partnership Project Technical Specification Group Radio Access Network, study on Physical layer procedures for data (Release 16), Jun. 2021, 173 pages.

International Search Report and Written Opinion in Appln. No. PCT/KR2022/010418, mailed on Oct. 21, 2022, 8 pages (with English translation).

3GPP, “3rd Generation Partnership Project; Technical Specification Group Radio Access Network; NR; Physical layer procedures for data (Release 16),” 3GPP TS 38.214 V16.5.0, Mar. 2021, 171 pages.

Extended European Search Report in European Appln. No. 22846160.4, mailed on Jun. 5, 2025, 13 pages.

MediaTek Inc., “Remaining Issues for Beam Management and Beam Failure Recovery,” R1-1808264, 3GPP TSG RAN WG1 Meeting #94, Gothenburg, Sweden, Aug. 20-24, 2018, 7 pages.

Moderator (OPPO), “Summary of [105-e-NR-eMIMO-03] Email Discussion,” R1-2106322, 3GPP TSG RAN WG1 #105-e, e-Meeting, May 10-27, 2021, 15 pages.

* cited by examiner

METHOD AND DEVICE FOR UPLINK OR DOWNLINK TRANSMISSION/RECEPTION IN WIRELESS COMMUNICATION SYSTEM

CROSS-REFERENCE TO RELATED APPLICATIONS

This application is a National Stage application under 35 U.S.C. § 371 of International Application No. PCT/KR2022/010418, filed on Jul. 18, 2022, which claims the benefit of Korean Application No. 10-2021-0095175, filed on Jul. 20, 2021. The disclosures of the prior applications are incorporated by reference in their entirety.

TECHNICAL FIELD

The present disclosure relates to a wireless communication system, and more specifically, to a method and device for performing uplink transmission and reception or downlink transmission and reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical problem of the present disclosure is to provide a method and device for performing uplink transmission and reception or downlink transmission and reception in a wireless communication system.

In addition, an additional technical problem of the present disclosure is to provide a method and device for performing uplink transmission and reception or downlink transmission and reception based on at least one of the corresponding QCL information when an individual QCL (quasi co-located) reference signal (RS) is set for each port group of a specific RS.

The technical objects to be achieved by the present disclosure are not limited to the above-described technical objects, and other technical objects which are not described herein will be clearly understood by those skilled in the pertinent art from the following description.

In one embodiment of the present disclosure, a method for a user equipment (UE) to perform uplink transmission or downlink reception in a wireless communication system may include receiving, from a base station, configuration information for an individual quasi co-located (QCL) RS for each of a plurality of port groups of a specific reference signal (RS); and performing the uplink transmission or the downlink reception based on at least one of a plurality of QCL RSs corresponding to a plurality of port groups of the specific RS.

In another embodiment of the present disclosure, a method for a base station to perform uplink reception or downlink transmission in a wireless communication system may include transmitting, to a user equipment (UE), configuration information for an individual quasi co-located (QCL) RS for each of a plurality of port groups of a specific reference signal (RS); and performing the uplink reception or the downlink transmission based on at least one of a plurality of QCL RSs corresponding to a plurality of port groups of the specific RS.

According to an embodiment of the present disclosure, a method and device for performing uplink transmission and reception or downlink transmission and reception in a wireless communication system may be provided.

According to one embodiment of the present disclosure, when an individual QCL RS is configured for each port group of a specific RS, a method and device for performing uplink transmission and reception or downlink transmission and reception based on at least one of the corresponding QCL information may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

BEST MODE

Figure 1:
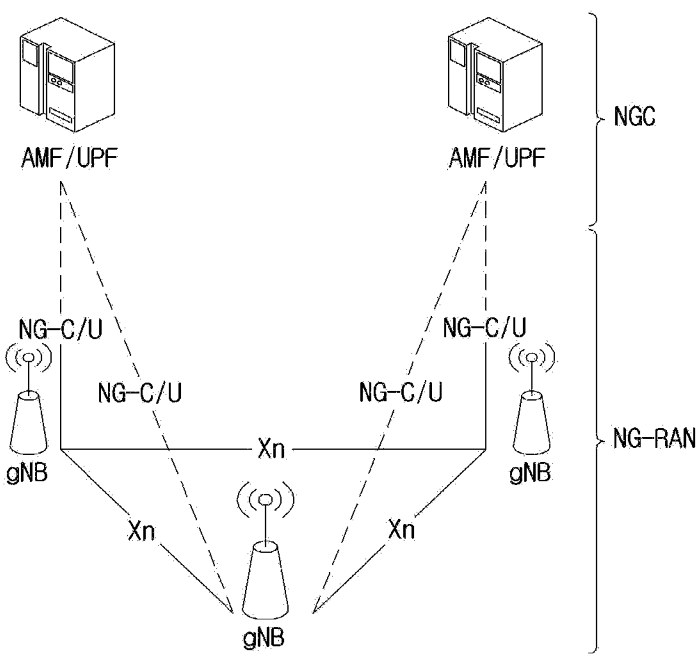
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5GRAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
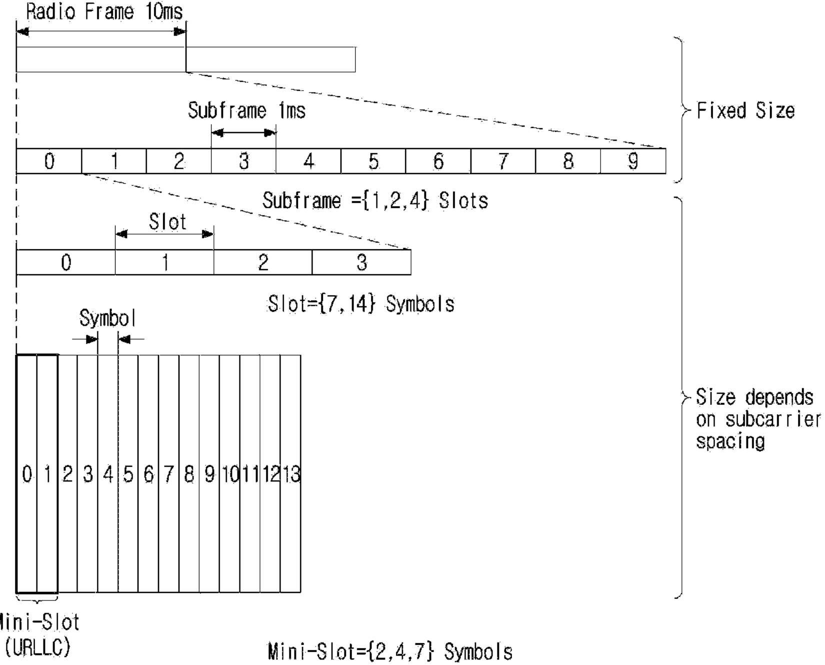
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} \cdot N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
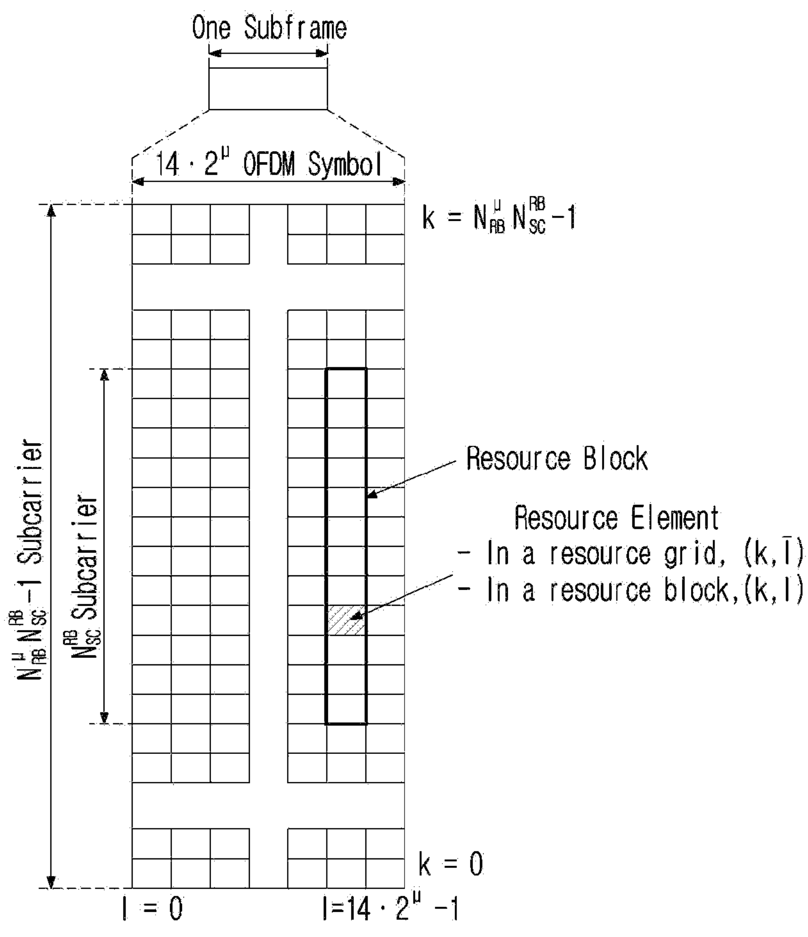
FIG. 3 illustrates a resource grid in a wireless communication system to which the present disclosure may be applied.

FIG. 2 is an example on $\mu$=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu N}{}_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per $\mu$ and antenna port p. Each element of a resource grid for and an antenna port p is referred to as a resource element and is uniquely identified by an index pair (k,l'). Here, $k=0, \ldots, N_{RB}^{\mu} N_{sc}^{RB}-1$ is an index in a frequency domain and $l'=0, \ldots, 2^{\mu} N_{symb}^{(\mu)}$ refers to a position of a symbol in a subframe. When referring to a resource element in a slot, an index pair (k,l) is used. Here, $l=0, \ldots, N_{symb}^{\mu}-1$. A resource element (k,l') for and an antenna port p corresponds to a complex value, $a_{k,l'}^{(p,\mu)}$. When there is no risk of confusion or when a specific antenna port or numerology is not specified, indexes p and may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain. Point A plays a role as a common reference point of a resource block grid and is obtained as follows. offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2. absoluteFrequencyPointA represents a frequency-position of point A expressed as in ARFCN (absolute radio-frequency channel number). Common resource blocks are numbered from 0 to the top in a frequency domain for a subcarrier spacing configuration. The center of subcarrier 0 of common resource block 0 for a subcarrier spacing configuration is identical to 'point A'. A relationship between a common resource block number $n_{CRB}^{\mu}$ and a resource element (k,l) for a subcarrier spacing configuration $\mu$ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}31$ 1 in a bandwidth part (BWP) and i is a number of a BWP. A relationship between a physical resource block $n_{PRB}$ and a common resource block $n_{CRB}$ in BWP i is given by the following Equation 2.

$$n^{\mu}_{CRB} = n^{\mu}_{PRB} + N^{start,\mu}_{BWP,i} \quad \text{[Equation 2]}$$

$N_{BWP,i}^{start,\mu}$ is a common resource block that a BWP starts relatively to common resource block 0.

Figure 4:
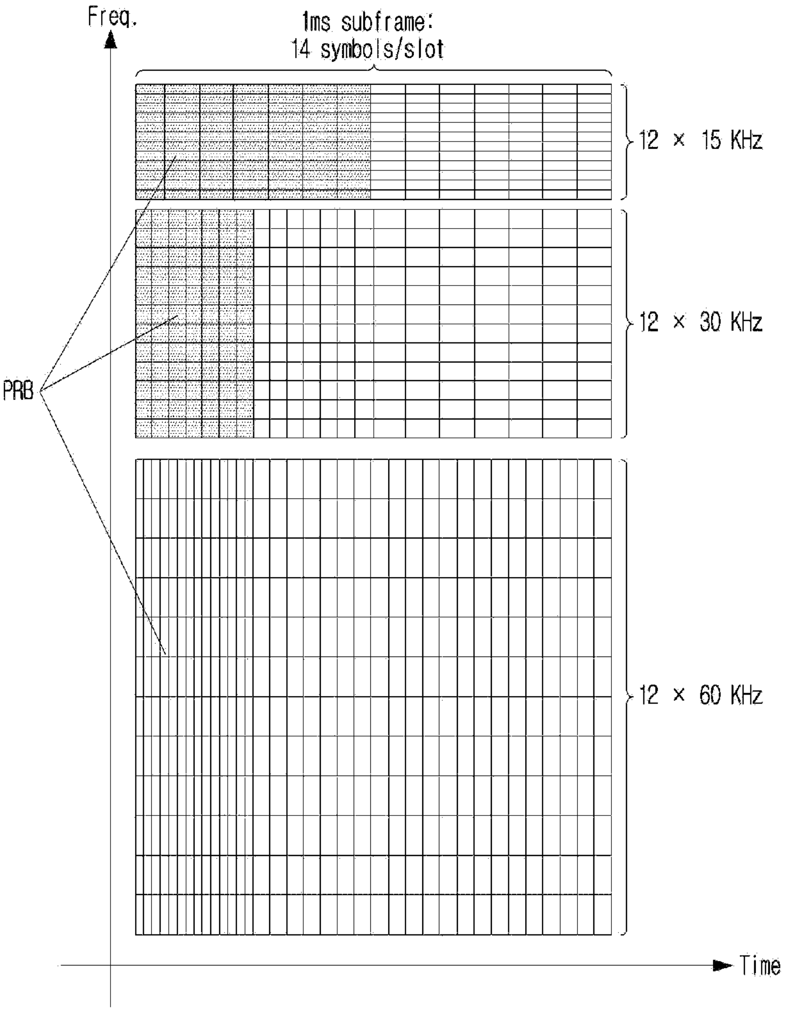
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
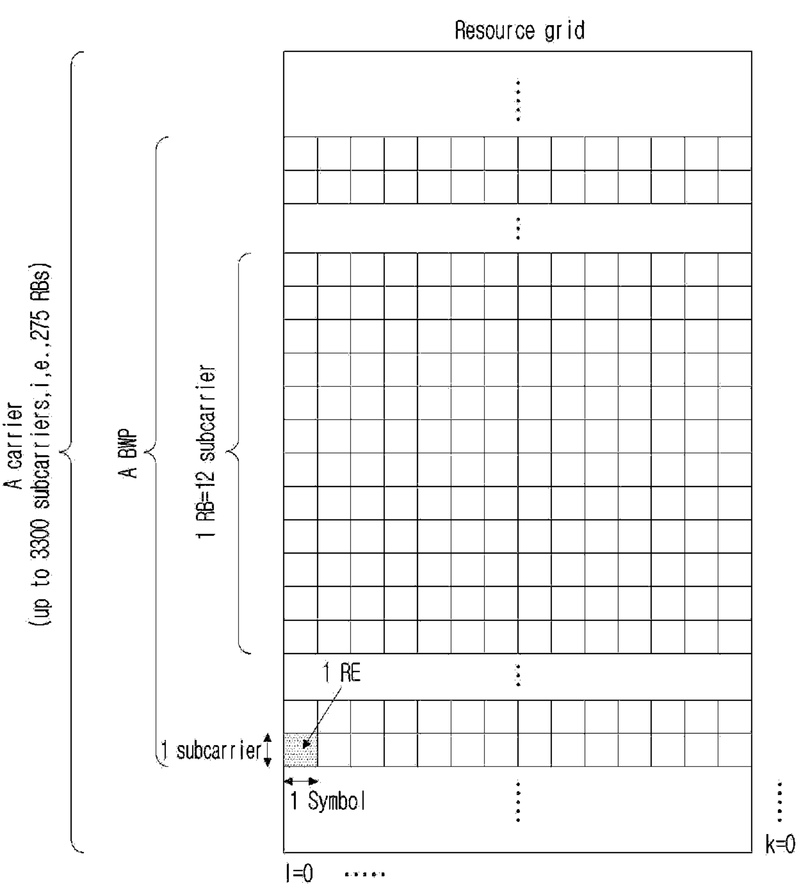
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
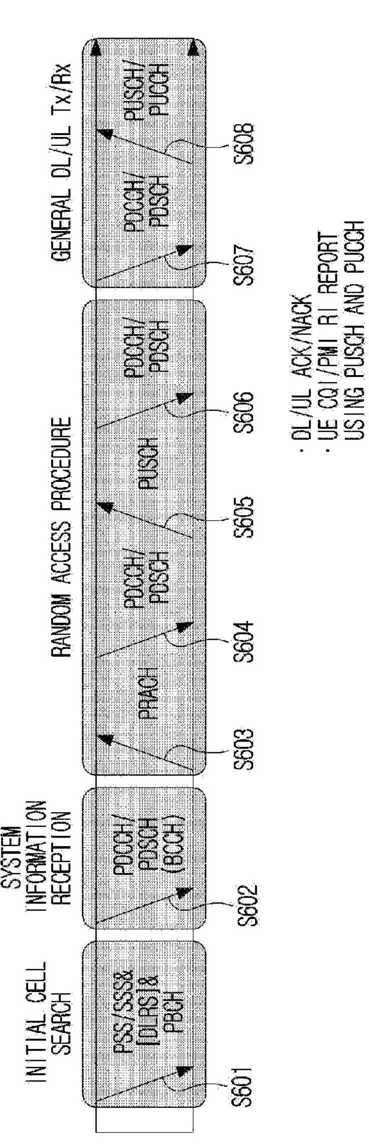
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. after that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 10, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Figure 7:
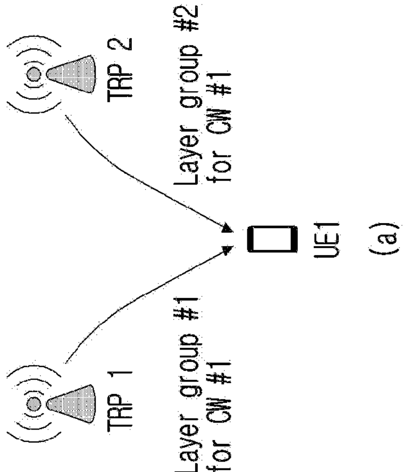
FIG. 7 illustrates a multiple TRP transmission scheme in a wireless communication system to which the present disclosure may be applied.

FIG. 7 illustrates a method of multiple TRPs transmission in a wireless communication system to which the present disclosure may be applied.

In reference to FIG. 7(*a*), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to the method illustrated in FIGS. 7 (*a*) and 7 (*b*) above, as the same TB is repeatedly transmitted through different layer groups and each layer group is transmitted by different TRP/panel, the data reception probability of the UE may be increased. This is referred to as a Spatial Division Multiplexing (SDM)-based M-TRP URLLC transmission scheme. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and Frequency Resource Allocation is Overlapped and n (n<=Ns) TCI States in a Single Slot 1-a) Method 1a.

The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule 1-b) Method 1b The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency Resource Allocation is not Overlapped and n (n<=Nf) TCI States in a Single Slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time Resource Allocation is not Overlapped and n (n<=Nt1) TCI States in a Single Slot Each transmission time (occasion) of a TB has time granularity of a mini-slot and has one TCI and one RV.

A common MCS is used with a single or multiple DMRS port(s) at all transmission time (occasion) in a slot.

A RV/TCI may be the same or different at a different transmission time (occasion).

4) Method 4 (TDM): n (n<=Nt2) TCI States in K (n<=K) Different Slots

Each transmission time (occasion) of a TB has one TCI and one RV.

All transmission time (occasion) across K slots uses a common MCS with a single or multiple DMRS port(s).

A RV/TCI may be the same or different at a different transmission time (occasion).

Downlink Multiple TRP (M-TRP) URLLC Transmission Operation

M-TRP transmission method in which M TRPs transmit data to one terminal may be broadly divided into two types: eMBB M-TRP transmission method, which is a method to increase transmission rate, and URLLC M-TRP transmission method, which is a method to increase reception success rate and reduce latency.

Also from a DCI transport perspective: the M-TRP transmission method can be divided into i) an M-DCI (multiple DCI)-based M-TRP transmission method in which each TRP transmits a different DCI, and ii) an S-DCI (single DCI)-based M-TRP transmission method in which one TRP transmits a DCI. For example, in the case of S-DCI, all scheduling information about data transmitted by M-TRP must be transmitted through one DCI, so it can be used in an ideal BH (ideal BackHaul) environment where dynamic cooperation between two TRPs is possible.

DL MTRP URLLC means that multiple TRPs transmit the same data/DCI by using a different layer/time/frequency resource. For example, TRP 1 transmits the same data/DCI in resource 1 and TRP 2 transmits the same data/DCI in resource 2.

That is, when the DL M-TRP URLLC transmission scheme is configured, the UE may receive the same data/DCI using different space/time/frequency resources. At this time, the UE may receive an indication of the QCL RS/type (i.e., DL TCI state) used in the space/time/frequency resource receiving the corresponding data/DCI from the base station.

For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

UL M-TRP URLLC transmission method refers to a method in which multiple TRPs receive the same data/UCI from one terminal using different space/time/frequency resources. For example, TRP 1 may receive the same data/UCI from the UE on resource 1, and TRP 2 may receive the same data/UCI from the terminal on resource 2. Additionally, TRP 1 and TRP 2 may share data/UCI received from the UE through a backhaul link (connected between TRPs).

That is, when the UL M-TRP URLLC transmission scheme is configured, the UE may transmit the same data/UCI to each TRP using different space/time/frequency resources. At this time, the UE may be indicated by the base station of the Tx beam and Tx power (i.e., UL TCI state) to be used in space/time/frequency resources transmitting the same data/UCI. For example, when the same data/UCI is transmitted in resource 1 and resource 2, the UE may be indicated by the base station of the UL TCI state used in resource 1 and the UL TCI state used in resource 2. Such UL MTRP URLLC may be applied to PUSCH/PUCCH.

Also, in describing the present disclosure, when receiving/transmitting data/DCI/UCI through a specific space/time/frequency resource, using (or mapping) a specific TCI state (or TCI) may mean, in the case of DL, that a channel is estimated from a DMRS using a QCL type and a QCL RS indicated by a specific TCI state in a specific space/time/frequency resource, and data/DCI/UCI is received/demodulated through the estimated channel.

In addition, when receiving/transmitting data/DCI/UCI through specific space/time/frequency resources, using (or mapping) a specific TCI state (or TCI) means, in the case of UL, may mean that DMRS and data/UCI are transmitted/modulated using a Tx beam and/or Tx power indicated by a specific TCI state in a specific space/time/frequency resource.

And, the UL TCI state may include Tx beam or Tx power information of the UE. In addition, the base station may configure spatial relation information and the like for the UE through other parameters instead of the TCI state.

For example, the UL TCI state may be directly indicated to the UE through a UL grant DCI. Alternatively, the UL TCI state may mean spatial relationship information of an SRS resource indicated through an SRS resource indicator (SRI) field of the UL grant DCI. Alternatively, the UL TCI state may mean an open loop (OP) Tx power control parameter connected to a value indicated through the SRI field of the UL grant DCI.

Here, the OL Tx power control parameter may include, for example, j (index and alpha for OP parameter(s) Po (up to 32 parameter value sets per cell), q_d (indices of DL RS resources for PL (path loss) measurement (up to 4 measurements per cell), or/and I (closed loop power control process index (up to 2 processes per cell)).

As another embodiment of the present disclosure, the M-TRP eMBB transmission scheme refers to a scheme in which M-TRP transmits different data/DCI using different space/time/frequency resources. If the M-TRP eMBB transmission method is configured, the UE may receive a plurality of TCI states from the base station through DCI, and may assume that data received using the QCL RS indicated by each of the plurality of TCI states is different data.

In addition, since the RNTI for M-TRP URLLC and the RNTI for M-TRP eMBB are separately used, the UE may determine whether specific transmission/reception is M-TRP URLLC transmission/reception or M-TRP eMBB transmission/reception. For example, when the RNTI for URLLC is used and CRC is masked for DCI, the UE may recognize the transmission as URLLC transmission. And, when the RNTI for eMBB is used and CRC masked for DCI, the UE may identify the corresponding transmission as eMBB transmission. As another example, the base station may configure the M-TRP URLLC transmission/reception method or the M-TRP eMBB transmission/reception method to the UE through new signaling.

For convenience of description of the present disclosure, it is assumed that 2 TRPs cooperate with each other to perform transmission/reception operations, but is not limited thereto. That is, the present disclosure may be extended and applied even in a multiple TRP environment of 3 or more, and may be extended and applied even in an environment where transmission/reception is performed using different panels or beams in the same TRP. The UE may recognize different TRPs as different TCI states. When the UE transmits/receives data/DCI/UCI using TCI state 1, it means that data/DCI/UCI/ is transmitted/received from (or through TRP 1).

The present disclosure may be utilized in a situation in which an MT-RP cooperatively transmits a PDCCH (repeatedly transmits the same PDCCH or transmits dividedly). In addition, the present disclosure may be utilized in a situation where the M-TRP cooperatively transmits PDSCH or cooperatively receives PUSCH/PUCCH.

Also, in describing the present disclosure, repetitive transmission of the same PDCCH by a plurality of base stations (i.e., M-TRPs) may mean that the same DCI is transmitted through a plurality of PDCCH candidates, and it means that multiple base stations repeatedly transmit the same DCI. Here, two DCIs having the same DCI format/size/payload can be regarded as the same DCI.

Alternatively, if the scheduling result is the same even though the payloads of the two DCIs are different, the two DCIs may be regarded as the same DCI. For example, the time domain resource allocation (TDRA) field of the DCI may relatively determine a slot/symbol position of data and a slot/symbol position of A (ACK)/N(NACK) based on a DCI reception time point.

In this case, when the DCI received at time n and the DCI received at time n+1 indicate the same scheduling result to the UE, the TDRA fields of the two DCIs are different, and as a result, the DCI payloads are different. Accordingly, when the scheduling result is the same even though the payloads of the two DCIs are different, the two DCIs may be regarded as the same DCI. Here, the number of repetitions R may be directly instructed by the base station to the UE or mutually promised.

Alternatively, even if the payloads of the two DCIs are different and the scheduling results are not the same, if the scheduling result of one DCI is a subset of the scheduling result of the other DCI, the two DCIs may be regarded as the same DCI.

For example, if the same data is TDM and repeatedly transmitted N times, DCI 1 received before the first data indicates data repetition (or scheduling) N times, and DCI 2 received before the second data indicates N−1 data repetition (scheduling). At this time, the scheduling result (or data) of DCI 2 becomes a subset of the scheduling result (or data) of DCI 1, and both DCIs have scheduling results for the same data. Therefore, even in this case, the two DCIs may be regarded as the same DCI.

And, in explaining the present disclosure, the operation of dividing and transmitting the same PDCCH by a plurality of base stations (i.e., M-TRP) may mean that one DCI is transmitted through one PDCCH candidate, but TRP 1 transmits some resources defined for the corresponding PDCCH candidate, and TRP 2 transmits the remaining resources.

For example, when TRP 1 and TRP 2 divide and transmit PDCCH candidates corresponding to the aggregation level m1+m2, PDCCH candidates are divided into PDCCH candidate 1 corresponding to aggregation level m1 and PDCCH candidate 2 corresponding to aggregation level m2, and TRP 1 may transmit PDCCH candidate 1 and TPR 2 may transmit PDCCH candidate 2. In this case, TRP 1 and TRP 2 may transmit PDCCH candidate 1 and PDCCH candidate 2 using different time/frequency resources. After receiving PDCCH candidate 1 and PDCCH candidate 2, the terminal may generate a PDCCH candidate corresponding to the merge level m1+m2 and attempt DCI decoding.

At this time, a scheme in which the same DCI is divided and transmitted to several PDCCH candidates may be implemented in the following two schemes.

In the first method, a DCI payload (e.g., control information+CRC) is encoded through one channel encoder (e.g., a polar encoder) and transmitted in two TRPs. That is, the first method refers to a method of dividing coded bits obtained according to an encoding result into two TRPs and transmitting them. Here, the entire DCI payload may be encoded in the coded bits transmitted by each TRP, but is not limited thereto, and only a part of the DCI payload may be encoded.

The second method is a method of dividing a DCI payload (e.g., control information+CRC) into two DCIs (e.g., DCI 1 and DCI 2) and then encoding each of them through a channel encoder (e.g., a polar encoder). Then, each of the two TRPs may transmit coded bits corresponding to DCI 1 and coded bits corresponding to DCI 2 to the UE.

That is, multiple base stations (M-TRPs) dividing/repeatedly transmitting the same PDCCH over multiple MOs (monitoring occasions) may mean that 1) coded bits encoding the entire DCI content of the corresponding PDCCH are repeatedly transmitted through each MO for each base station (S-TRP), 2) coded bits encoding the entire DCI content of the corresponding PDCCH are divided into a plurality of parts, and each base station (S-TRP) transmits different parts through each MO, or 3) the DCI content of the corresponding PDCCH is divided into a plurality of parts, and different parts are encoded (i.e., separately encoded) for each base station (S-TRP) and transmitted through each MO.

Repeatedly/divided transmission of the PDCCH may be understood as transmission of the PDCCH multiple times over several transmission occasions (TOs).

Here, TO may mean a specific time/frequency resource unit in which the PDCCH is transmitted. For example, when the PDCCH is transmitted multiple times (to a specific RB) over slots 1, 2, 3, and 4, TO may mean each slot. As another example, when the PDCCH is transmitted multiple times (in a specific slot) over RB sets 1, 2, 3, and 4, TO may mean each RB set. As another example, if the PDCCH is transmitted multiple times over different times and frequencies, TO may mean each time/frequency resource. In addition, a different TCI state used for DMRS channel estimation may be configured for each TO, and TOs with different TCI states may be assumed to be transmitted by different TRPs/panels.

Repetitive or divided transmission of PDCCHs by a plurality of base stations means that PDCCHs are transmitted over multiple TOs, and the union of TCI states configured in the corresponding TOs is composed of two or more TCI states. For example, when the PDCCH is transmitted over TO 1,2,3,4, TCI states 1,2,3,4 may be configured in each of TO 1,2,3,4, and it means that TRP i cooperatively transmitted the PDCCH in TO i.

In describing the present disclosure, if the UE repeatedly transmits the same PUSCH to a plurality of base stations (i.e., M-TRPs), it may mean that the UE transmits the same data through a plurality of PUSCHs, and each PUSCH may be transmitted while being optimized for UL channels of different TRPs.

For example, the UE may repeatedly transmit the same data through PUSCH 1 and PUSCH 2. At this time, PUSCH 1 is transmitted using UL TCI state 1 for TRP 1, and PUSCH may be transmitted by scheduling a value optimized for a channel of TRP 1 through link adaptation such as a precoder/MCS. PUSCH 2 is transmitted using UL TCI state 2 for TRP 2, and link adaptation such as a precoder/MCS is also scheduled with a value optimized for the channel of TRP 2, and PUSCH may be transmitted. In this case, PUSCH 1 and PUSCH 2 that are repeatedly transmitted may be transmitted at different times and may be TDM, FDM, or SDM.

Also, in describing the present disclosure, an operation in which the UE divides and transmits the same PUSCH to a plurality of base stations (i.e., M-TRP) may mean that one data is transmitted through one PUSCH, but resources allocated to the PUSCH are divided and transmitted in an optimized manner for UL channels of different TRPs.

For example, the UE may transmit the same data through 10 symbol PUSCH. At this time, the first 5 symbols among 10 symbols can be transmitted using UL TCI state 1 for TRP 1, and the UE may transmit a 5-symbol PUSCH (through TRP 1) by receiving a scheduling value optimized for link adaptation such as a precoder/MCS and a channel of TRP 1. The remaining 5 symbols may be transmitted using UL TCI state 2 for TRP 2, and the UE may transmit the remaining 5 symbol PUSCH (via TRP 2) by receiving a scheduling value optimized for link adaptation such as precoder/MCS and the channel of TRP 2.

In the above example, a method of dividing one PUSCH into time resources and TDM for transmission toward TRP 1 and transmission toward TRP 2 has been described. However, the present disclosure is not limited thereto, and the UE may divide and transmit the same PUSCH to a plurality of base stations by exclusively using the FDM/SDM scheme.

The UE may repeatedly transmit the PUCCH to a plurality of base stations (similar to PUSCH transmission) or divide and transmit the same PUCCH.

In addition, when multiple TOs are indicated to the UE for repeated or divided transmission of PDCCH/PDSCH/PUSCH/PUCCH, each TO may transmit UL toward a specific TRP or receive DL from a specific TRP. Here, UL TO (or, TO of TRP 1) transmitted toward TRP 1 may mean TO using the first value of two spatial relationships indicated to the UE, two UL TCIs, two UL power control parameters, or two PL (path-loss)-RSs. In addition, UL TO (or, TO of TRP 2) transmitted toward TRP 2 means TO using the second value of two spatial relationships indicated to the UE, two UL TCIs, two UL power control parameters, and two PL-RSs.

Similarly, during DL transmission, DL TO transmitted by TRP 1 (or TO of TRP 1) means TO using the first value of the two DL TCI states indicated to the UE (e.g., when two TCI states are configured in CORESET), and DL TO (or, TO of TRP 2) transmitted by TRP 2 may mean TO using the second value of the two DL TCI states indicated to the UE (for example, when two TCI states are configured in CORESET).

The present disclosure may be expanded and applied to various channels such as PUSCH/PUCCH/PDSCH/PDCCH. Additionally, the present disclosure may be extended and applied to both the case of repeatedly transmitting the channel to different space/time/frequency resources and the case of divided transmission.

M-TRP SFN (Single Frequency Network) Transmission Method

Improvements to the SFN transmission method in which M-TRP transmits the same data together through the same layer/same DMRS port in the same time/frequency domain are in progress.

For example, in the case of the layer 1 M-TRP SFN transmission method, TRP 1 and TRP 2 can transmit the same data to the UE using the same DMRS port and the same time/frequency resources. At this time, as the DL QCL beam information (i.e., QCL reference RS defined in TCI state) for DMRS is configured for each TRP, the DMRS port may receive both QCL beam information for TRP 1 and QCL beam information for TRP 2. Since the same data transmitted by two TRPs is received through one DMRS port, the channel estimated through the DMRS port may be a composite channel combining the DL channel of TRP 1 and the DL channel of TRP 2. At this time, because the channel phases of each TRP are not aligned with each other, a synthetic channel may be created by randomly performing a constructive sum or a destructive sum on the channels of each TRP.

Therefore, the SFN transmission method can be viewed as a type of M-TRP NCJT method, and since M-TRP transmits a common layer, it may be referred to as common layer NCJT.

NCJT (Non-Coherent Joint Transmission) Method

The NCJT method refers to a method in which multiple TPs (transmission points) transmit data to one UE using the same time and frequency, and data may be transmitted to different layers using different DMRS ports between TPs. TP may transmit data scheduling information to the UE receiving NCJT through DCI.

At this time, the method in which each TP participating in NCJT transmits scheduling information about the data it transmits to DCI may be referred to as multi-DCI-based NCJT. Since each of N TPs participating in NCJT transmission transmits DL grant DCI and PDSCH to the UE, the UE can receive N DCI and N PDSCH from N TPs.

Differently, a method in which one representative TP transmits scheduling information about the data it transmits and the data transmitted by other TPs through one DCI may be referred to as a single DCI-based NCJT. At this time, N TPs may transmit one PDSCH. At this time, each TP may transmit only some of the multiple layers that make up one PDSCH. For example, when 4-layer data is transmitted, TP 1 transmits layer 2, and TP 2 transmits the remaining 2 layers to the UE.

Hereinafter, the multi-DCI-based NCJT method and the single DCI-based NCJT method will be described in detail.

First, in the case of a single DCI-based M-TRP method, M-TRPs may cooperatively transmit one common PDSCH together, and each TRP participating in cooperative transmission may transmit the corresponding PDSCH by spatially dividing it into different layers (i.e., different DMRS ports). At this time, scheduling information for the PDSCH is indicated to the UE through one DCI, and the QCL RS and QCL type information used for each DMRS port may be indicated in the DCI.

At this time, the above-described method is different from the method of indicating the QCL RS and type to be commonly applied to all DMRS ports through DCI. That is, M TCI states are indicated through the TCI field in the DCI (in case of 2 TRP cooperative transmission, M=2), and the QCL RS and type may be identified for each M DMRS port group using the different M TCI states. Additionally, DMRS port information may be indicated using a new DMRS table.

In addition, in the case of the multi-DCI-based M-TRP method, each M-TRP may transmit a different DCI and PDSCH, and the corresponding PDSCHs may be transmitted (partially or entirely) overlapping each other on frequency/time resources. The corresponding PDSCHs are scrambled through different scrambling IDs, and the corresponding DCIs may be transmitted through CORESETs belonging to different CORESET groups.

Here, the CORESET group may identify the index defined within the CORESET configuration information corresponding to each CORESET. For example, the index is configured to 0 in the CORESET configuration information corresponding to CORESET 1 and 2, and if the index is configured to 1 in the CORESET configuration information corresponding to CORESET 3 and 4, CORESET 1 and 2 may belong to CORESET group 0, and CORESET 3 and 4 may belong to CORESET group 1.

Additionally, if the index is not defined on the configuration information corresponding to the CORESET, the index corresponding to the CORESET may be interpreted as 0. If multiple scrambling IDs are configured in one serving cell or two or more CORESET groups are configured, the UE may be determined to be receiving data using the multi-DCI-based M-TRP method.

For example, whether a single DCI-based M-TRP method or a multi-DCI-based M-TRP method may be indicated to the UE through separate signaling. For example, when multiple CRS patterns are indicated to the UE for M-TRP operation for one serving cell, depending on whether it is a single DCI-based M-TRP method or a multi-DCI-based M-TRP method, PDSCH rate matching for CRS (cell-specific reference signal) may vary. Here, a tracking reference signal (TRS) may be used as a function of CRS, and the UE may use TRS to estimate timing offset, delay spread, frequency offset, and Doppler spread.

Additionally, NCJT may be divided into fully overlapped NCJT, in which the time-frequency resources transmitted by each TP completely overlap, and partially overlapped NCJT, in which only some time-frequency resources overlap. That is, in the case of partially overlapped NCJT, data from both TP 1 and TP 2 can be transmitted in some time-frequency resources, and only data from either TP 1 or TP 2 may be transmitted in the remaining time-frequency resources.

In the case of the M-TRP NCJT transmission method, two TRPs may transmit different data using different layers/DMRS ports.

For example, DMRS ports belonging to different CDM groups may be grouped. In addition, a DMRS port belonging to the first CDM group may be received using the first QCL beam information (i.e., first TCI state indicated), and a DMRS port belonging to the second CDM group may be received using the second QCL beam information (i.e., indicated second TCI state).

As described above, since the layers/DRMS ports transmitted by the two TRPs are separate and data is not transmitted through a composite channel, there may be no need to align the channel phases of the two TRPs. The above method may be referred to as the (M-TRP) NCJT method, and may also be referred to as the independent layer NCJT method.

M-TRP CJT (Coherent Joint Transmission) Method

Similar to the M-TRP SFN method, in the case of the M-TRP CJT method, M-TRP may transmit the same data through the same layer/DMRS port for the same time/frequency region.

However, unlike the M-TRP SFN method, in the M-TRP CJT method, the channel phases of each TRP are aligned with each other, so ideally, a constructive sum may be performed on the two channels to create a composite channel. Accordingly, when the M-TRP CJT method is applied, a higher SNR gain may be obtained through beamforming.

To ensure that the channel phases of each TRP are aligned with each other, the UE may feed back the phase difference between the two TRP channels by adding it to the CSI. Here, CSI may collectively refer to information that may indicate the quality of a wireless channel (or link) formed between a UE and an antenna port.

Additionally, when data is transmitted in multiple layers, some layers apply the CJT method, but some layers may only transmit one TRP. For example, when transmitting a rank 2 PDSCH, TRPs 1 and 2 in the first layer transmit the same data through the CJT method, but only TRP 1 may transmit data in the second layer.

Hereinafter, for CSI feedback for CJT transmission (i.e., CSI with co-phase for the DL channel of each TRP), a method of configuring CMR (channel measurement resource) and CSI content for a UE so that the base station can measure the channels of two TRPs is described.

Method 1

Method 1 relates to a method of performing a measurement operation on one concatenated channel through one CMR. Specifically, one CSI-RS may be configured to CMR, but some ports of the CSI-RS may be transmitted by TRP 1 and the remaining ports may be transmitted by TRP 2. When method 1 is used, some ports of the CSI-RS may be configured with QCL beam information for TRP 1 (or TCI state or QCL reference RS defined in the TCI state), and the remaining ports may be configured with QCL beam information for TRP 2.

By measuring the channel with the corresponding CMR, the UE may estimate a channel for a transmission (Tx) antenna port equal to the sum of the number of ports in TRP 1 and the number of ports in TRP 2. And, the UE may calculate the PMI for ports equal to the sum of the number of ports in TRP 1 and the number of ports in TRP 2. At this time, the calculated PMI reflects the optimal co-phase between the port of TRP 1 and the port of TRP 2, so the UE may feed back the calculated RI/PMI/CQI to the base station.

Method 2

Method 2 relates to a method of performing a measurement operation for one connected channel through two CMRs. Specifically, CMR 1 may be configured to CSI-RS 1 transmitted by TRP 1, and CMR 2 may be configured to CSI-RS 2 transmitted by TRP 2. The UE may estimate each of the TRP 1 channel and TRP 2 channel by measuring the channel with the corresponding CMR. Additionally, the UE may concatenate the estimated channels to create all channels of TRP 1 and TPR 2.

For example, the UE may estimate the 2-port channel of TRP 1 with CMR 1 and the 2-port channel of TRP 2 with CMR 2, and then connect each estimated channel to create a 4-port channel. The UE may calculate RI/PMI/CQI for the created channel (e.g., 4-port channel) and feed it back to the base station.

Method 3

Method 3 relates to a method of performing measurement operations for two channels through two CMRs. Specifically, in the case of method 3, two CMRs may be configured the same as method 2. However, unlike method 2, in method 3, the UE does not connect the channels measured through two CMRs. The UE may calculate RI 1/PMI 1 from the channel of CMR 1, RI 2/PMI 2 from the channel of CMR 2, and calculate the co-phase value between each channel. In addition, the UE may calculate the CQI that may be achieved when transmitting the CJT PDSCH using RI 1/PMI 1/RI 2/PMI 2/co-phase and feed back all the calculated values.

When the above-described method 1 is applied, different QCL beam information may be applied to each port group of the CSI-RS. If the corresponding CSI-RS is configured to a (spatial) reference signal or default beam through the active TCI state/spatial relation info, when transmitting and receiving a corresponding channel or signal, it may be unclear which of the different QCL beams to use.

Hereinafter, when individual QCL RSs are configured for each multiple port group of a specific RS (e.g., CSI-RS), a method of performing uplink transmission and reception or downlink transmission and reception based on the corresponding QCL RS will be described.

In describing the present disclosure, QCL beam information may mean a QCL (source) RS corresponding to one specific QCL type. In addition, the QCL type may be QCL type A (e.g., at least one of Doppler shift, Doppler spread, average delay, or delay spread) or QCL type D (e.g., spatial Rx parameter).

For example, when configuring a CSI-RS (or any other RS) in FR 1 where QCL type D is unnecessary, multiple QCL RSs may be configured for QCL type A. And, in FR 2, multiple QCL RSs may be configured for QCL type A, and multiple QCL RSs may be configured for QCL type D.

In another error, the UE may receive an activation command by MAC CE signaling, which is used to map up to eight TCI states to the codepoint of the TCI field in the DCI.

And, in UL, QCL beam information may mean spatial relationship RS or/and UL PL-RS. In other words, the UE may distinguish and identify PL-RSs for each port group for one RS. Accordingly, when there are two port groups, the UE may identify and apply two PL-RSs to one RS. Even in this case, a rule may be applied/defined or the base station may indicated/configured so that the UE selects and applies one PL-RS. Alternatively, both PL-RSs can be used, but the PL-RSs may be mapped to each channel/RS/TO transmitted through different TRPs according to the M-TRP technique.

Figure 8:
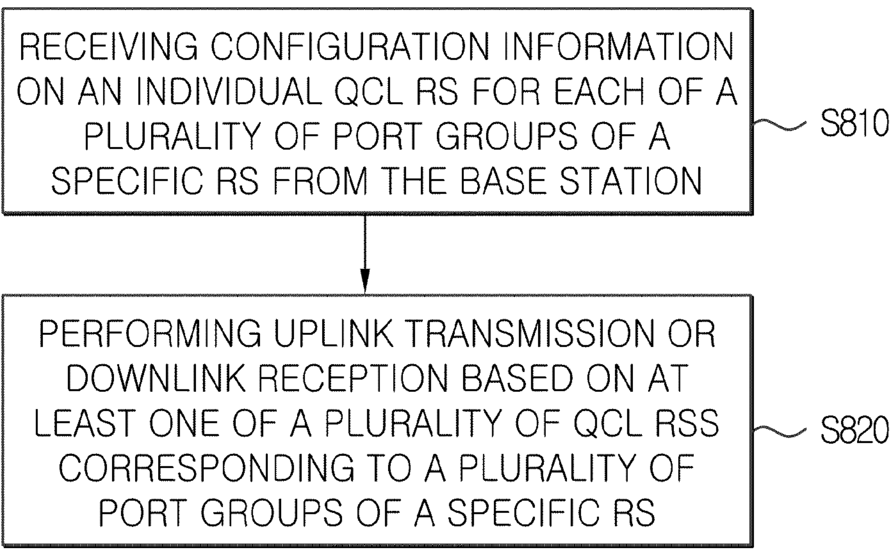
FIG. 8 is a diagram for describing an uplink transmission operation or a downlink reception operation of a terminal in a wireless communication system to which the present disclosure may be applied.

FIG. 8 is a diagram for describing an uplink transmission operation or a downlink reception operation of a terminal in a wireless communication system to which the present disclosure may be applied.

In describing the present disclosure, Uplink transmission may includes at least one of physical uplink shared channel (PUSCH) transmission, physical uplink control channel (PUCCH) transmission, or sounding reference signal (SRS) transmission, and downlink reception may include at least one of physical downlink shared channel (PDSCH) reception, physical downlink control channel (PDCCH) reception, or aperiodic (AP) CSI-RS reception. However, the types of each uplink/downlink transmission and reception are not limited to the examples described above.

Additionally, in describing the present disclosure, a specific RS may include a CSI-RS, but is not limited thereto and may include other types of RS (e.g., SRS, etc.).

The UE may receive configuration information on an individual quasi co-located (QCL) reference signal (RS) for each of a plurality of port groups of a specific RS from the base station (S810).

For example, if there are two port groups of a specific RS (e.g., CSI-RS), individual QCL (source RS (or QCL (beam) information, etc.)) may be configured for each port group. Here, individual QCL RSs (e.g., SSB, other CSI-RS, SRS, etc.) configured for each port group may be different. As another example, a different panel ID may be configured for each port group of a specific RS.

The UE may perform uplink transmission or downlink reception based on at least one of a plurality of QCL RSs corresponding to a plurality of port groups of a specific RS (S820).

As an example, the UE may perform uplink transmission or downlink reception using a specific QCL RS among a plurality of QCL RSs.

For example, a specific QCL RS among the plurality of QCL RSs may be determined based on the size of the index value of the plurality of QCL RSs or the size of the index value of the port group corresponding to the plurality of QCL RSs. And, uplink transmission or downlink reception may be performed using the specific QCL RS.

As another example, the UE may perform uplink transmission or downlink reception using all of a plurality of QCL RSs.

Here, by the unified transmission configuration indicator (TCI) state, a first QCL RS among a plurality of QCL RSs may be configured to be used for downlink reception, and a second QCL RS among a plurality of QCL RSs may be configured to be used for uplink transmission.

As another example, a specific RS (e.g., CSI-RS) may be configured as a reference RS for downlink reception by active transmission configuration indicator (TCI) state.

Additionally or alternatively, a specific RS may be configured as a reference RS for uplink transmission by (active) spatial relationship information. Here, spatial relationship information may mean information for establishing a spatial relationship between uplink transmission and a reference RS.

As another example, uplink transmission or downlink reception may be performed in multiple transmission occasions (TO). And, the first TO among the plurality of TOs is a TO in which uplink transmission or downlink reception is performed using the first QCL RS among the plurality of QCL RSs. The second TO among the plurality of TOs may be a TO in which uplink transmission or downlink reception is performed using the second QCL RS among the plurality of QCL RSs. That is, it is assumed that uplink or downlink is transmitted and received repeatedly/divided over multiple TOs. At this time, uplink/downlink transmission and reception may be performed using the first QCL RS or second QCL RS for each TO.

As another example, uplink transmission or downlink reception may be performed through the first panel and the second panel. At this time, the first panel and the second panel may be activated simultaneously, and uplink transmission or downlink reception may be performed simultaneously through each panel. However, this is not limited to this, and activation of each panel may be performed alternately or according to predefined rules.

And, uplink transmission or downlink reception performed through the first panel may be performed using the first QCL RS among a plurality of QCL RS, and Uplink transmission or downlink reception performed through the second panel may be performed using a second QCL RS among a plurality of QCL RSs. That is, the first panel may correspond to the first QCL RS, and the second panel may correspond to the second QCL RS.

As another example, information configuring a QCL RS to be used for uplink transmission or downlink reception among a plurality of QCL RSs may be received from the base station. The information may be transmitted from the base station to the terminal through RRC signaling/MAC-CE/DCI.

As an another example, if the time offset between the reception time of downlink control information (DCI) and the PDSCH reception time scheduled by the DCI being less than the threshold (configured by the base station), PDSCH reception may be performed using at least one of a plurality of QCL RSs as a default beam. Here, the above-described example (e.g., an example using one or all of the plurality of QCL RSs) may be applied as a method of determining a QCL RS to be used as a default beam among the plurality of QCL RSs.

As another example, based on DCI format 0_0 (i.e., DCI that does not include SRI (SRS resource indicator)) being received from the base station, PUSCH transmission scheduled by DCI format 0_0 may be performed using at least one of a plurality of QCL RSs as a default beam.

Figure 9:
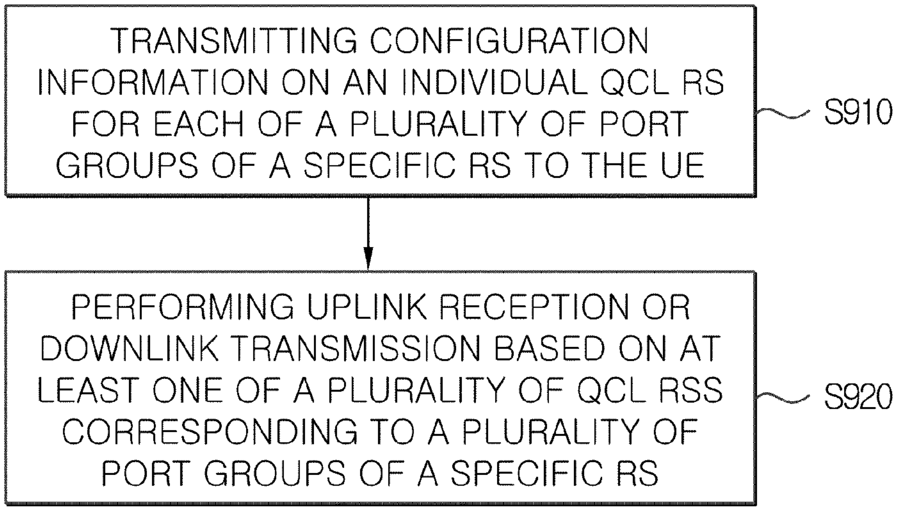
FIG. 9 is a diagram for describing an uplink reception operation or a downlink transmission operation of a base station in a wireless communication system to which the present disclosure may be applied.

FIG. 9 is a diagram for describing an uplink reception operation or a downlink transmission operation of a base station in a wireless communication system to which the present disclosure may be applied.

The base station may transmit configuration information on individual QCL reference signals for each of a plurality of port groups of a specific RS to the UE (S910).

At this time, the base station may transmit at least one of information configuration individual (e.g., different) panel IDs for each plurality of port groups or information setting whether to receive CSI-RS through a single panel or multiple panels to the UE.

The base station may perform uplink reception or downlink transmission based on at least one of a plurality of QCL RSs corresponding to a plurality of port groups of a specific RS (S920).

Since the uplink/downlink transmission/reception method and features related to QCL RS have been described with reference to FIG. 8, redundant description will be omitted.

Hereinafter, when a QCL beam is individually configured for each port group of a specific RS, a method of performing uplink transmission and reception or downlink transmission and reception based on the corresponding QCL beam will be described in detail.

Embodiment 1

Assume that a CSI-RS (or any other RS) having different QCL beam information for each port group is configured as a reference RS in the active TCI state or as a spatial relationship RS in the spatial relationship information. At this time, when transmitting and receiving PDCCH/PDSCH/PUSCH/PUCCH/SRS for which the corresponding TCI state/space relationship information is configured, it may not be clear which of the different QCL beams configured for each port group of the corresponding CSI-RS should be used.

To solve the above problem, CSI-RS (or any other RS) having different QCL beam information for each port group may be limited to being configured only for CSI feedback. That is, the corresponding CSI-RS may be restricted from being configured as a reference RS according to TCI status or spatial relationship information.

However, the above limitation may reduce the freedom of scheduling. In order to solve the above-mentioned problem without this limitation, the terminal can be defined to use only one QCL beam among the two QCL beams configured for each CSI-RS port group.

For example, the UE may be determined/defined/configured to use only the QCL beam for the lowest port of the CSI-RS among the two QCL beams. As an example, the UE may be determined/defined/configured to use only the first (or second) QCL beam among the two QCL beams, or to use only the QCL beam with a lower (or higher) index among the two QCL beams. Alternatively, the base station may directly indicate/configure which of the two QCL beams to use.

As another example, the UE may be determined/defined/configured to use all different QCL beams configured for each port group of CSI-RS.

For example, for M-TRP transmission in a wireless communication system, two TCI states may be configured/activated for PDCCH/PDSCH. At this time, the PDCCH may be transmitted using the SFN transmission method using the two TCI states, and PDSCH may be transmitted in an independent layer JT method/FDM/TDM repetition transmission method/SFN method using two TCI states.

Even if one TCI state is configured/activated on PDCCH/PDSCH, it is assumed that in the corresponding TCI state, an RS with different QCL beam information for each port group (e.g., two QCL beam information for two port groups) is configured as the QCL reference RS. At this time, the different QCL beam information may play the role of 2 TCI states, and various M-TRP transmission methods supported in the wireless communication system may be used using the TCI states. Additionally, PDSCH/PDCCH may be transmitted using the CJT method.

As another example, assume that two spatial relationship information is configured/activated for PUCCH/PUSCH for M-TRP transmission in a wireless communication system. At this time, a (TDM) repetitive transmission method based on two beam information may be applied to PUCCH/PUSCH. Here, similar to the DL transmission/reception method described above, when an RS having different QCL beam information for each port group (e.g., two QCL beam information for two port groups) in one spatial relationship information is configured as a spatial relationship RS, M-TRP PUCCH/PUSCH repetitive transmission operation may be performed using the two beam information of the corresponding RS.

Additionally, a UL SFN-like transmission method may be applied using the two QCL beam information. For example, the UE may simultaneously transmit the same layer through two Tx beams corresponding to two QCL beam information, and the base station may receive the corresponding layer transmitted by the terminal through the two Tx beams. The above-described method is a method of performing UL transmission by changing the transmitting end and the receiving end in the DL SFN transmission method.

As another example, the UE may simultaneously transmit the same layer using two panels, but may consider using QCL beam information 1 and 2 in panels 1 and 2, respectively. That is, the UE may perform a transmission operation using the STxMP (simultaneous transmission on multi-panel) method based on QCL beam information 1 and 2.

As another example, the UE may utilize the STxMP SDM scheme based on QCL beam information 1 and 2. Specifically, for STxMP PUSCH transmission in a single-DCI-based M-TRP system, the (STxMP) SDM method may be applied. The (STxMP) SDM method may mean that different layers/DMRS ports of one PUSCH are individually precoded and transmitted simultaneously from different panels. Here, when transmitting different layers/ports of the same PUSCH, the UE may transmit some layers/ports using QCL beam information 1 and transmit the remaining layers/ports using QCL beam information 2.

Additionally, in a single-DCI based M-TRP system, the FDM-B method, FDM-A method, SFN-based transmission method, and SDM repetition method may be applied. The FDM-B method means that two PUSCH transmission occasions with the same/different RV of the same TB are transmitted on different panels on non-overlapping frequency domain resources and the same time domain resource. The FDM-A method refers to a method in which different parts of the frequency domain resources of one PUSCH transmission opportunity are transmitted in different panels. The SFN-based transmission method means that all the same layers/DMRS ports of one PUSCH are transmitted simultaneously on two different panels. The SDM repetition method means that two PUSCH transmission opportunities with different RVs of the same TB are transmitted simultaneously on two different panels.

As another example, the UE may apply the UL SFN-like transmission method or the dash UL CJT-like transmission method. The UL CJT-like transmission method has some similarities to the UL SFN-like transmission method. However, in the case of the UL CJT-like transmission method, the UE may align the co-phase between the layer transmitted on Tx beam 1 and the layer transmitted on Tx beam 2. Accordingly, the base station may receive the corresponding layer from the composite channel on which constructive sum was performed.

To support this, the base station may indicate a co-phase value to the UE. For example, in the case of PUSCH, the base station may indicate the co-phase value to the UE through the UL grant DCI. In the case of PUCCH/SRS, the base station may indicate the co-phase value for each PUCCH/SRS resource to the UE through MAC-CE or RRC signaling. As another example, the base station may indicate the UE by additionally configuring a co-phase value in the spatial relationship information, or by additionally configuring it in the UL TCI state or the UL/DL unified TCI state.

Various transmission techniques applied in PUCCH/PUSCH using the two QCL beam information may be extended and applied to SRS transmission. That is, if an RS with different QCL beam information for each port group (e.g., two QCL beam information for two port groups) is configured as a spatial relationship RS in the spatial relationship information of the SRS, the UE may use the two QCL beam information to apply various transmission methods (e.g., UL SFN-like transmission method, UL CJT-like transmission method) described based on the PUSCH/PUCCH.

In an improved wireless system, beam information configured in one TCI state (i.e., integrated TCI state) may be applied not only to the DL channel but also to the UL channel. For example, the TCI state indicated by the DCI that scheduled the PDSCH may be used to receive the PDSCH. In addition, the corresponding TCI state may be used to configure UL beam/transmission power when transmitting PUCCH including ACK/NACK information of the corresponding PDSCH. Additionally, the corresponding TCI state may also be used to configure the UL beam/transmission power of the PUSCH transmitted after PUCCH transmission.

At this time, when a CSI-RS (or any other RS) with different QCL beam information for each port group is configured as a QCL reference signal in the integrated TCI state, one QCL beam may be applied to the DL channel, and the other QCL beam may be applied to the UL channel.

Alternatively, the base station may indicate/configure the UE to determine/determine which QCL beam to use for which channel. As another example, channel/signal transmission/reception operations may be performed based on a QCL beam determined according to a specific rule (e.g., the QCL beam for the lowest port of the RS, the first (or, the second) QCL beam of the two QCL beams of the RS, the QCL beam with the lower (or higher) index of the two QCL beams of the RS, etc.).

Embodiment 2

When a CSI-RS (or any other RS) with different QCL beam information for each port group is configured as the default beam for PDSCH/AP (aperiodic) CSI-RS/PUSCH/PUCCH transmission and reception, it may not be clear which of the two beams of the corresponding RS should be used as the default beam.

For example, if the time offset between the scheduling DCI and the scheduled PDSCH (or AP CSI-RS) is less than or equal to the time threshold specified by the base station, the UE may receive the corresponding channel or RS using the default beam in a designated manner for receiving the scheduled PDSCH (or AP CSI-RS). Alternatively, in the case of DCI format 0_0 among UL grant DCIs, the SRI field may not exist. At this time, the spatial relationship RS of the PUCCH resource with the lowest ID may be used as the default beam of the scheduled PUSCH.

To solve the above-described problem, the method described in Embodiment 1 may be applied. That is, through the method described in Embodiment 1, one of the different QCL beams set for each port group may be used as a default beam, or all different QCL beams (for example, two QCL beams) may be used as the default beam.

As another example, CSI-RS (or any other RS) with different QCL beam information for each port group may be set only for CSI feedback purposes and may be restricted from being set as a default beam.

Embodiment 3

The base station may configure/specify the panel ID of the UE for each port group of the CSI-RS and set the UE on which panel to receive the corresponding port group. For example, port group 0 may be configured to panel ID 0, and port group 1 may be configured to panel ID 1.

Additionally, the base station may configure whether to receive the CSI-RS through a single panel or multiple panels. If the base station knows the panel information of a UE with a strong SNR or SINR for each Tx beam, the base station may guarantee a good channel for each port group by setting/assigning a panel ID to the port group through the above-described operation.

Alternatively, when reporting CSI using the corresponding CSI-RS as a CMR, the UE may freely select a panel and report together which port group was received through which panel. Accordingly, the base station may know which UE Rx panel is optimal for the Tx beam corresponding to the port group, and may use the information for future beam management. The above-described operations may be performed under the assumption that an explicit panel ID is defined.

As another example, when no explicit panel ID is defined, assume that a CSI-RS with QCL type D RS configured for each port group is configured to CMR, and the corresponding CSI-RS is set as a reference signal for TCI state such as PDCCH/PDSCH/PUCCH/PUSCH/SRS/DL-RS or spatial relationship information, and the M-TRP transmission method is performed. At this time, the UE may use the corresponding CSI-RS to perform M-TRP PDCCH/PDSCH/PUCCH/PUSCH/SRS/DL-RS transmission and reception operations by using the Rx panel for each port group that was used in the most recent CSI measurement.

Additionally or alternatively, the operations/configurations described in Embodiments 1 to 3 may be extended and applied to Method 2 and Method 3.

As an example, for Method 2 and Method 3, two CMRs (e.g., CSI-RS) may be configured for CJT. It is assumed that the two CSI-RSs are configured as reference RSs for TCI state or spatial relationship information such as PDCCH/PDSCH/PUCCH/PUSCH/SRS/DL-RS, and the M-TRP transmission method is performed accordingly. At this time, the UE may perform the corresponding M-TRP PDCCH/PDSCH/PUCCH/PUSCH/SRS/DL-RS transmission and reception operation by using the Rx panel for each CMR that was most recently used in the CSI measurement through the corresponding CSI-RS.

As another example, the base station may configure a panel ID for each CMR in a CMR pair. Additionally or alternatively, the UE may report panel ID information for CMR along with CSI to the base station.

And, for convenience of description of the present disclosure, it is assumed that two TRPs participate in JT transmission, but the embodiments of the present disclosure may be extended and applied even when three or more TRPs transmit JT.

For example, when three TRPs perform JT transmission, three QCL beam information may be configured as three port groups are configured in CSI-RS for CMR. Alternatively, three CMRs may be grouped and configured by individually configuring the CSI-RS transmitted by each TRP to a CMR. In the latter case, the UE may estimate three channels from three CMRs and then create a concatenated channel. And, the UE may operate like method 2 or may operate like method 3, which calculates the CSI for each channel.

If operating like method 3, the UE may report two co-phase values instead of one, and may report the co-phase of the second CMR and the co-phase of the third CMR based on the first CMR (or CMR with lowest ID CSI-RS). And, the UE may feed back three RI/PMIs to the base station.

Additionally, in the present disclosure, when a CSI-RS (or any other RS) with different QCL beam information for each port group is configured as a reference RS in the active TCI state or as a spatial relationship RS in the spatial relationship information, the transmission method of PDCCH/PDSCH/PUSCH/PUCCH/SRS in which the corresponding TCI state/space relationship information is configured has been described. Likewise, the above-described transmission method can be extended and applied to JTs of 3 TRP or more. That is, M-TRP PDCCH/PDSCH/PUSCH/PUCCH/SRS transmission and SFN-like transmission may be performed by selecting one beam information or utilizing all multiple beam information.

Figure 10:
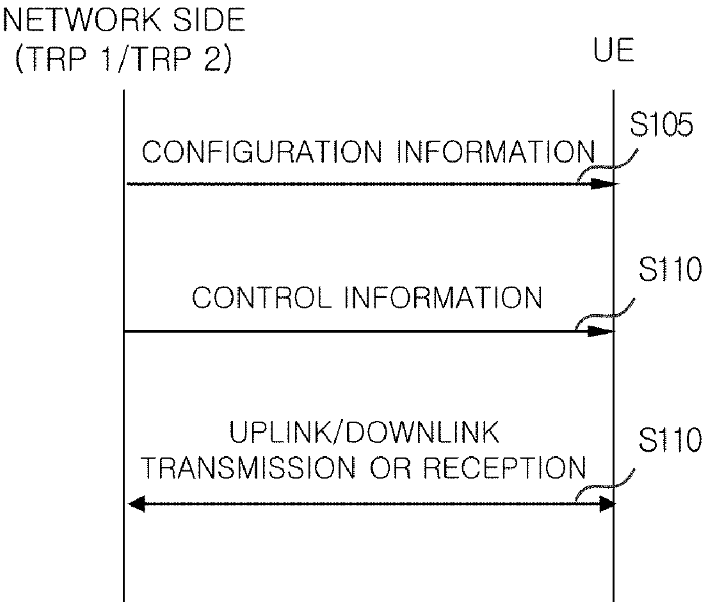
FIG. 10 is a diagram for describing the signaling procedure of the network side and the terminal according to an embodiment of the present disclosure.

FIG. 10 is a diagram for describing the signaling procedure of the network side and the terminal according to an embodiment of the present disclosure.

FIG. 10 shows an example of signaling between a network side and a terminal (UE) in an M-TRP situation to which the embodiments of the present disclosure (e.g., Embodiment 1, Embodiment 2, Embodiment 3, or a combination of one or more of their specific Embodiments) described above may be applied.

Here, the UE/network side is an example and may be replaced with various devices as described with reference to FIG. 11. FIG. 10 is for convenience of explanation and does not limit the scope of the present disclosure. Additionally, some step(s) shown in FIG. 10 may be omitted depending on the situation and/or settings. Additionally, in the operation of the network side/UE in FIG. 10, the above-described uplink transmission and reception operation, M-TRP-related operation, etc. may be referenced or used.

In the following description, the network side may be one base station including a plurality of TRPs, or may be one cell including a plurality of TRPs. Alternatively, the network side may include a plurality of remote radio heads (RRHs)/remote radio units (RRUs). For example, an ideal/non-ideal backhaul may be established between TRP 1 and TRP 2 constituting the network side. In addition, although the following description is based on a plurality of TRPs, this may be equally extended and applied to transmission through a plurality of panels/cells, and may also be extended and applied to transmission through a plurality of RRHs/RRUs.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP (Transmission Point), at least one TRP (Transmission and Reception Point), etc. In addition, a TP and/or a TRP may include a panel, a transmission and reception unit, etc. of a base station.

The UE may receive configuration information from the network side through/using TRP1 and/or TRP2 (S105).

The configuration information may include information related to CORESET in which a plurality of TCI states are configured. The configuration information may include information related to network-side configuration (i.e., TRP configuration), resource allocation information related to transmission and reception based on M-TRP, and the like. The configuration information may be transmitted through higher layers (e.g., RRC, MAC CE). In addition, when the setting information is defined or configured in advance, the corresponding step may be omitted.

As another example, the configuration information may include information for configuring an individual QCL reference RS for each port group of a specific RS (e.g., CSI-RS). As another example, the configuration information may include information related to a specific RS (e.g., CSI-RS) for which a different QCL reference RS is configured for each port group.

For example, the information related to the CSI-RS may include at least one of CSI-IM (interference management) resource related information, CSI measurement configuration related information, CSI resource configuration related information, CSI-RS resource related information, or CSI reporting configuration related information.

CSI-IM resource-related information may include CSI-IM resource information, CSI-IM resource set information, etc. A CSI-IM information set is identified by a CSI-IM resource set ID (identifier), and one resource set may include at least one CSI-IM resource. Each CSI-IM resource can be identified by a CSI-IM resource ID.

CSI resource configuration-related information may be expressed as 'CSI-ResourceConfig IE'. CSI resource setting-related information defines a group including at least one of the NZP CSI-RS resource set, CSI-IM resource set, or CSI-SSB resource set.

That is, the CSI resource configuration related information includes a CSI-RS resource set list, and the CSI-RS resource set list may include at least one of an NZP CSI-RS resource set list, a CSI-IM resource set list, or a CSI-SSB resource set list. A CSI-RS resource set is identified by a CSI-RS resource set ID, and one resource set may include at least one CSI-RS resource. Each CSI-RS resource can be identified by a CSI-RS resource ID.

For each NZP CSI-RS resource set, parameters indicating the purpose of CSI-RS (e.g., 'repetition' parameter related to BM (beam management), 'trs-Info' parameter related to tracking, etc.) may be configured. The repetition parameter corresponding to the upper layer parameter may correspond to 'CSI-RS-ResourceRep' of the L1 parameter.

CSI reporting configuration-related information (For example, 'CSI-ReportConfig IE') may include a report configuration type (reportConfigType) parameter indicating time domain behavior and a report Quantity parameter indicating CSI-related quantity for reporting. The time domain operation may be periodic, aperiodic, or semi-persistent.

In CSI-RS, RE mapping of CSI-RS resources may be configured in the time and frequency domains by 'CSI-RS-ResourceMapping', a higher layer parameter. 'Density' in 'CSI-RS-ResourceMapping' indicates the density of CSI-RS resources measured in RE/port/PRB, and 'nrofPorts' may indicate the number of antenna ports.

The UE may measure CSI based on the configuration information related to the CSI described above. CSI measurement may include a CSI-RS reception process by the UE and a process of calculating CSI through the received CSI-RS.

The UE may report the measured CSI to the base station. If the quantity of CSI reporting setting-related information (e.g., 'CSI-ReportConfig') is configured to 'none (or No report)', the UE may omit CSI reporting. However, even when the quantity is configured to 'none (or No report)', the UE may report CSI to the base station. When the quantity is configured to 'none', it may mean that an aperiodic TRS is triggered or 'repetition' is set. Here, when 'repetition' is configured to 'ON', the UE may omit CSI reporting.

Additionally or alternatively, the configuration information may include information for setting a CSI-RS for which an individual QCL reference RS is configured for each port group as a reference signal or default beam.

For example, the operation of the UE (100 or 200 in FIG. 11) in step S105 described above receiving the configuration information from the network side (200 or 100 in FIG. 11) may be implemented by the device in FIG. 11, which will be described below. For example, referring to FIG. 11, one or more processors 102 may control one or more transceivers 106 and/or one or more memories 104 to receive the configuration information, and one or more transceivers 106 may receive the configuration information from a network side.

The UE may receive control information from the network (S110). For example, the UE may receive a DCI scheduling uplink/downlink from the network side. Additionally, if the control information is defined or set in advance, the corresponding step may be omitted.

For example, the operation of the UE (100 or 200 in FIG. 11) in step S110 described above receiving the control information from the network side (200 or 100 in FIG. 11) may be implemented by the device in FIG. 11, which will be described below. For example, referring to FIG. 11, one or more processors 102 may control one or more transceivers 106 and/or one or more memories 104 to receive the control information, and one or more transceivers 106 may receive the control information from a network side.

The UE may transmit uplink or receive downlink to the network (S115).

Here, a CSI-RS with individual QCL RS set for each port group for uplink transmission or downlink reception may be configured as a reference RS or default beam. For example, the corresponding CSI-RS may be configured as a reference RS by TCI status or/and spatial relationship information. As another example, the corresponding CSI-RS may be configured as the default beam for uplink transmission. The UE may perform uplink transmission or downlink reception using at least one of a plurality of QCL RSs configured in a plurality of port groups of CSI-RS.

The UE may perform uplink transmission or downlink reception using at least one of a plurality of QCL RSs based on the Embodiments of the present disclosure (e.g., Embodiment 1, Embodiment 2, Embodiment 3, or a combination of one or more of their specific Embodiments).

For example, the operation of the UE (100 or 200 in FIG. 11) in step S115 described above transmitting uplink to the network side (200 or 100 in FIG. 11) or receiving downlink from the network side (200 or 100 in FIG. 11) may be implemented by the device of FIG. 11, which will be described below.

Figure 11:
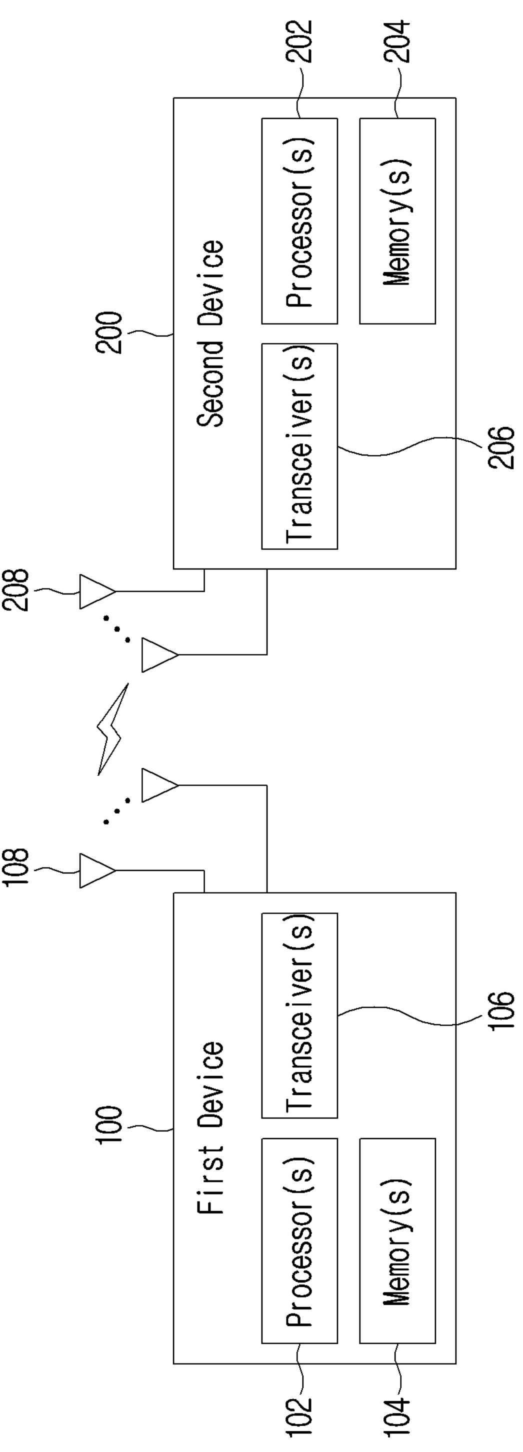
FIG. 11 illustrates a block diagram of a wireless communication device according to an embodiment of the present disclosure.

For example, referring to FIG. 11, one or more processors 102 may control one or more transceivers 106 and/or one or more memories 104, etc. to transmit uplink or receive downlink and one or more transceivers 106 may transmit uplink or receive downlink to the network side.

General Device to which the Present Disclosure May be Applied

FIG. 11 is a diagram which illustrates a block diagram of a wireless communication system according to an embodiment of the present disclosure.

In reference to FIG. 11, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure.

One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202.

Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands. One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection. One or more transceivers 106, 206 may transmit user data, control information, a wireless signal/channel, etc.

mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a user equipment (UE) from a base station, configuration information related to a non-zero power (NZP) channel state information-reference signal (CSI-RS) resource; and performing, by the UE, uplink transmission or downlink reception based on the configuration information, wherein the configuration information includes i) a number of ports of a plurality of port groups related to the CSI-RS resource, and ii) information related to an individual quasi co-located (QCL) RS for each of the plurality of port groups, wherein based on a time offset between a time of a first downlink control information (DCI) reception and a time of the downlink reception scheduled by the first DCI being less than a threshold, the downlink reception is performed using a first default beam related to a first QCL RS among the individual QCL RSs for the plurality of port groups, and wherein based on a second DCI scheduling the uplink transmission being received from the base station, the uplink transmission is performed using a second default beam related to a second QCL RS among the individual QCL RSs for the plurality of port groups.

2. The method of claim 1, wherein:

the uplink transmission or the downlink reception is performed in a plurality of transmission occasions (TO), a first TO among the plurality of TOs is a TO in which the uplink transmission or the downlink reception is performed using a third QCL RS among the individual QCL RSs, and a second TO among the plurality of TOs is a TO in which the uplink transmission or the downlink reception is performed using a fourth QCL RS among the individual QCL RSs.

3. The method of claim 1, wherein:

the uplink transmission or the downlink reception is performed through a first panel and a second panel, the uplink transmission or the downlink reception performed through the first panel is performed using a first QCL RS among individual QCL RSs, and the uplink transmission or the downlink reception performed through the second panel is performed using a second QCL RS among the individual QCL RSs.

4. The method of claim 1, wherein:

by an unified transmission configuration indicator (TCI) state, a first QCL RS among the individual QCL RSs is configured to be used for the downlink reception, and a second QCL RS among the individual QCL RSs is configured to be used for the uplink transmission.

5. The method of claim 1, wherein:

a CSI-RS based on the CSI-RS resource is configured as a reference RS for the downlink reception by an active transmission configuration indicator (TCI) state.

6. The method of claim 1, wherein:

a CSI-RS based on the CSI-RS resource is configured as a reference RS for the uplink transmission by spatial relation information.

7. The method of claim 1, wherein:

based on a size of an index value of the individual QCL RSs or a size of an index value of a port group corresponding to the individual QCL RSs, a fifth QCL RS among the individual QCL RSs is determined, and the uplink transmission or the downlink reception is performed using the fifth QCL RS.

8. The method of claim 1, wherein:

information for configuring a QCL RS to be used for the uplink transmission or the downlink reception among the individual QCL RSs is received from the base station.

9. The method of claim 1, wherein:

the uplink transmission includes at least one of physical uplink shared channel (PUSCH) transmission, physical uplink control channel (PUCCH) transmission, or sounding reference signal (SRS) transmission, and the downlink reception includes at least one of physical downlink shared channel (PDSCH) reception, physical downlink control channel (PDCCH) reception, or aperiodic (AP) CSI-RS reception.

10. The method of claim 1, wherein:

at least one of information configuring an individual panel ID for each of the plurality of port groups or information configuring whether to receive a CSI-RS based on the CSI-RS resource through a single panel or multiple panels is received from the base station.

11. A user equipment (UE) comprising:

at least one transceiver; and at least one processor connected to the at least one transceiver, wherein the at least one processor is configured to:

receive, from a base station through the at least one transceiver, configuration information related to a non-zero power (NZP) channel state information-reference signal (CSI-RS) resource; and perform uplink transmission or downlink reception based on the configuration information, wherein the configuration information includes i) a number of ports of a plurality of port groups related to the CSI-RS resource, and ii) information related to an individual quasi co-located (QCL) RS for each of the plurality of port groups, wherein based on a time offset between a time of a first downlink control information (DCI) reception and a time of the downlink reception scheduled by the first DCI being less than a threshold, the downlink reception is performed using a first default beam related to a first QCL RS among the individual QCL RSs for the plurality of port groups, and wherein based on a second DCI scheduling the uplink transmission being received from the base station, the uplink transmission is performed using a second default beam related to a second QCL RS among the individual QCL RSs for the plurality of port groups.

12. A base station comprising:

at least one transceiver; and at least one processor connected to the at least one transceiver, wherein the at least one processor is configured to:

transmit, to a user equipment (UE) through the at least one transceiver, configuration information related to a non-zero power (NZP) channel state information-reference signal (CSI-RS) resource; and perform uplink transmission or downlink reception based on the configuration information, wherein the configuration information includes i) a number of ports of a plurality of port groups related to the CSI-RS resource, and ii) information related to an individual quasi co-located (QCL) RS for each of the plurality of port groups, wherein based on a time offset between a time of a first downlink control information (DCI) reception and a time of the downlink reception scheduled by the first DCI being less than a threshold, the downlink reception is performed using a first default beam related to a first QCL RS among the individual QCL RSs for the plurality of port groups, and wherein based on a second DCI scheduling the uplink transmission being received from the base station, the uplink transmission is performed using a second default beam related to a second QCL RS among the individual QCL RSs for the plurality of port groups.

* * * * *